Nov. 20, 1928.  1,692,379
H. E. KEMPTON ET AL
WORKHOLDER
Original Filed July 25, 1924
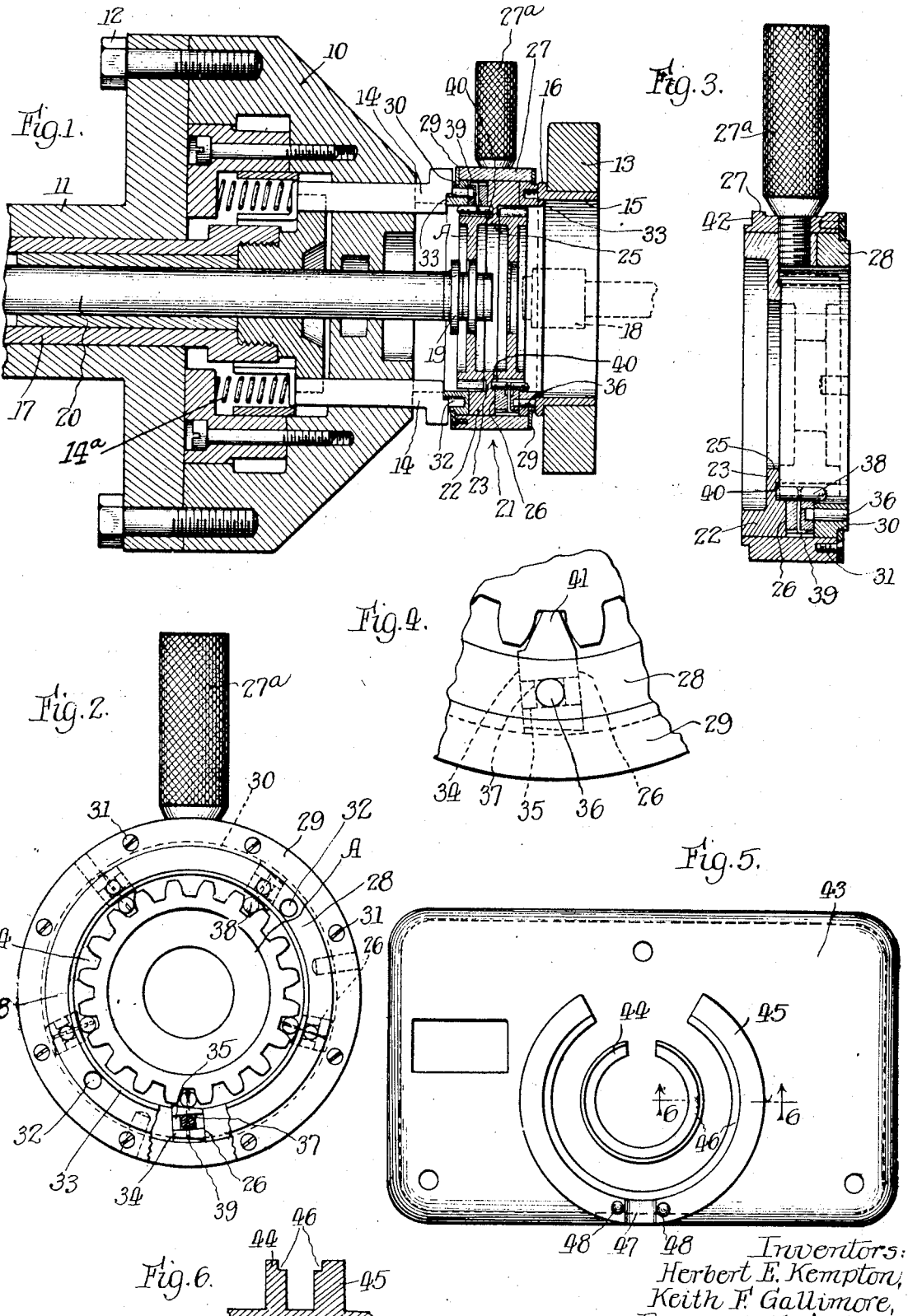
Inventors:
Herbert E. Kempton,
Keith F. Gallimore,
Raymond M. Woytych, Patented Nov. 20, 1928.

1,692,379

UNITED STATES PATENT OFFICE.

HERBERT E. KEMPTON, OF CHICAGO, ILLINOIS, AND KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

WORKHOLDER.

Application filed July 25, 1924, Serial No. 728,063. Renewed September 21, 1928.

Our invention relates to a novel work holding apparatus for chucking work in a machine tool chuck or fixture for a metal removing operation; and relates more particularly to a removable shuttle of the type disclosed in the copending application Serial No. 680,826, filed December 15, 1923, of Kempton and Gallimore, which is constructed to hold one or more pieces of work in centered position and is adapted to be centrally clamped with said work in the chuck.

It is a general object of our invention to provide a shuttle of simple and novel construction for holding one or more gear blanks or other parts having irregular surfaces.

A further object is to provide a shuttle of the above character which is inexpensive and easy to manufacture, and in which the clamping means serves to accurately center the work.

Ancillary objects and advantages will become apparent as the description proceeds.

In the accompanying drawings, Figure 1 is a longitudinal sectional view of a work shuttle embodying the features of our invention and mounted in a chuck of suitable construction.

Fig. 2 is an end view of the shuttle shown in Fig. 1, with parts broken away to show one of the clamping jaws in elevation.

Fig. 3 is a sectional view taken along the diameter of a shuttle for holding a single piece of work.

Fig. 4 is a fragmentary view on an enlarged scale showing a modified form of the locating or centering means.

Fig. 5 is a plan view on a reduced scale of a fixture for facilitating loading of the shuttles.

Fig. 6 is a section taken along line 6—6 of Fig. 5.

While we have illustrated in the drawings and will herein describe in detail the preferred embodiment of our invention, it is to be understood that we do not thereby intend to limit the invention to the preferred construction shown, but aim in the appended claims to cover all modified forms and alternative constructions falling within the spirit and scope of the invention.

Referring to the drawings, 10 represents a chuck of any suitable construction which is secured to a rotatable spindle 11 by tap screws 12, and in the present instance is provided with a face plate 13 and a plurality of clamping members 14. A centering bushing 15 having a peripheral flange 16 on its inner end is mounted in the face plate 13, and is adapted to engage and center the part being chucked. The clamping members 14 are slidably mounted in the chuck body for movement toward and from the bushing 15 and are adapted to be moved forwardly by a plurality of springs 14$^a$, and rearwardly by a suitable draw bar 17. The work when chucked is operated on by a suitable element 18, and is gaged by a member 19 mounted on the forward end of a rod 20 extending through the spindle 11.

Clamped within the chuck 10 is a removable shuttle 21 constructed to hold a pair of gear blanks A in centered position relative to the axis of rotation. The shuttle 21 comprises a body 22 in the form of an inner ring having a radial flange 23 on its inner periphery substantially midway of its ends. The flange 23 defines the inner limits of a pair of pockets 24 for receiving the blanks A in opposite ends of the body 22, and is formed with a slightly enlarged peripheral edge 25 for backing and truing the inner end surfaces of the blanks.

A plurality of inwardly extending notches or guideways 26 are formed in each end of the body 22, and are slightly inclined with respect to the axis of the shuttle. Fitting over the body 22 to close the outer ends of the notches 26 is an outer ring 27 which is made separate of the body 22 to facilitate forming the notches 26, and can be secured in place when assembled by any suitable means, such as the handle 27$^a$. A pair of actuator rings 28 are rotatably mounted in opposite ends of the ring 27, and against the ends of the body 22 to close the sides of the notches 26. The rings 28 are held in place by a pair of annular retaining members or plates 29 which engage in annular notches 30 formed in the outer edges of the rings, and which are secured respectively to opposite ends of the ring 27 by screws 31. Each actuator ring 28 is provided at its outer surface with a pair of diametrically opposed adjusting holes or depressions 32, and with a concentric pilot or centering flange 33 adapted to fit into the bushing 15 to center the shuttle in the chuck.

Slidably mounted in the closed guideways 26 are a plurality of clamping jaws or members 34, each of which is provided with a transverse notch 35 in its outer face. A plurality of jaw pins 36 are rotatably mounted in the actuator rings 28, and are provided with square heads 37 which selectively and slidably engage with the notches 35. Since the notches 35 are slightly inclined relative to the direction of movement of the heads 37 with which they are respectively associated, rotatable adjustment of either actuator ring 28 will cause the jaws 34 connected thereto to move longitudinally and simultaneously toward or from the blank A.

Either of two methods may be employed to locate and center the work blanks A in the shuttle, namely: a pitch control as illustrated in Figs. 1 to 3, or a root control as shown in Fig. 4. Where pitch control is used, a cylindrical locating pin 38 is secured to the inner end of each jaw 34 by a suitable means such as the bent wire 39. The pins 38 extend longitudinally of the shuttle 21, and at their inner ends fit loosely into depressions 40 formed in the sides of the flange 23. Upon inward movement, the pins 38 are adapted to engage the sides of the gear teeth to accurately center each blank A and clamp it rigidly in centered position. Where root control is used, each jaw 34 is formed integral with a V-shaped centering tool or point 41. These points 41 are adapted to clear the sides and to engage the roots of the gear teeth to center and clamp the blanks A.

In Fig. 3 we have illustrated a shuttle which is adapted to hold only a single work blank. This shuttle in general is similar in construction to either end of the double shuttle shown in Fig. 1, and differs from the latter only in the elimination of certain duplicate parts, such as one actuator ring 28, one retaining plate 29, and one set of clamping jaws 34. One end of the outer ring 27 does not extend beyond the ring 22, and is formed with a notch 42 to provide a centering pilot for the shuttle.

Either shuttle 21 may be conveniently loaded by the use of a loading fixture 43, such as is shown in Figs. 5 and 6. This fixture is provided with a pair of concentric upstanding flanges 44 and 45 having annular notches 46 in their adjacent upper edges adapted to receive the centering pilot of the shuttle 21. The outer flange 45 is formed midway of its ends with a transverse groove 47, and is provided with a pair of vertical pins 48 at opposite sides of the groove to receive the handle 27ª and prevent the body of the shuttle from turning while being loaded. With the shuttle in position on the fixture 43, the actuator ring 28 can be rotatably adjusted by any suitable means, such as a spanner wrench (not shown), to clamp the work blank in place. Where the double shuttle is used it must be turned over to load both sides.

It will be seen that we have provided a simple and improved shuttle for chucking one or more gear blanks. The clamping means operates to locate each work blank precisely in centered position, and to clamp the same securely in such position without injury to the teeth. Because of the ease and accuracy with which the work can be centered and clamped in place, the shuttle can be quickly loaded and unloaded. While the shuttle is primarily intended for gear blanks, it is to be understood that other uses may arise which will fall within the contemplation of the invention.

We claim as our invention:

1. In apparatus of the class described, in combination, an inner ring having a plurality of inwardly extending notches formed in each end, an outer ring fitting over said inner ring, a pair of actuator rings fitting into the opposite ends of said outer ring and against the ends of said inner ring, means holding said actuator rings rotatably in place, a plurality of clamping jaws slidably mounted in said notches, each clamping jaw being provided with centering means on its inner end, and means operatively connecting said actuator rings to said jaws.

2. In apparatus of the class described, in combination, a hollow body formed with two sets of inwardly extending notches, one set being formed in each end of said body, two actuator rings one rotatably mounted on each end of said body, a plurality of jaws slidably mounted in said notches, and means operatively connecting said actuator rings respectively with the jaws in each set, said means serving to move said jaws longitudinally in said notches as said actuator rings are rotatably adjusted.

3. In apparatus of the class described, in combination, a ring shaped body constructed to receive a work blank in each end, said body being formed with two sets of inwardly extending notches, one set being formed in each end of said body, two actuator members one positioned against each end of said body to close the outer sides of the adjacent notches, a plurality of jaws one mounted in each notch, each jaw having a transverse notch in its outer side, and a plurality of pins mounted for rotation with said actuator members and respectively engaging the transverse notches in said jaws to move the latter longitudinally in said notches upon rotation of said actuator members.

4. In apparatus of the class described, in combination, a hollow body constructed to receive a work blank, means for limiting the inner position of said work blank, said body being formed with a plurality of inwardly extending notches, a plurality of clamping jaws one slidably mounted in each notch, an actuator ring rotatably mounted at one end of said body and closing the outer sides of said notches, and means carried by said actuator ring and having a wedge engagement with said jaws whereby said jaws will be moved simultaneously and longitudinally in said notches as said actuator ring is rotatably adjusted.

5. In apparatus of the class described, in combination, a body constructed to receive a work blank, a plurality of independent jaws slidably mounted in the peripheral wall of said body for movement toward and from the periphery of said work blank, actuator means mounted in said body, and separate means independently connecting each jaw with said actuator means and serving to move said jaws simultaneously toward or from said work blank as said actuator means is adjusted.

6. In apparatus of the class described, in combination, a body constructed to support a work blank, a plurality of clamping members slidably mounted for inward movement in said body, each member having a transverse notch, actuator means, and a plurality of pins mounted for rotation with said means and selectively engaging said notches to move said members simultaneously upon adjustment of said actuator means.

7. In apparatus of the class described, in combination, a body constructed to support a work blank, a plurality of clamping members slidably mounted in said body, an actuator ring rotatably mounted in said body, and means independently connecting said ring with each clamping member, said means having a sliding wedge connection with the latter.

In testimony whereof we have hereunto affixed our signatures.

HERBERT E. KEMPTON.
KEITH F. GALLIMORE.
RAYMOND M. WOYTYCH.